United States Patent [19]

Jordan

[11] Patent Number: 5,199,772

[45] Date of Patent: Apr. 6, 1993

[54] UNIVERSAL VEHICLE COMMUNICATION CONSOLE

[75] Inventor: Glenn A. Jordan, Harvard, Mass.

[73] Assignee: Glenn A. Jordan, Harvard, Mass.

[21] Appl. No.: 823,897

[22] Filed: Jan. 22, 1992

[51] Int. Cl.$^5$ .............................................. B60R 7/00
[52] U.S. Cl. ..................................... 312/7.1; 312/312; 224/42.42; 248/27.1
[58] Field of Search ................. 312/7.1, 312; 248/27.1; 224/42.42, 42.45; 296/37.8

[56] References Cited

U.S. PATENT DOCUMENTS

| | | | |
|---|---|---|---|
| 886,192 | 4/1908 | De Canio | 312/312 |
| 3,685,879 | 8/1972 | Tsuji | 312/7.1 |
| 3,827,772 | 8/1974 | Johnson | 296/37.8 |
| 3,984,161 | 10/1976 | Johnson | 312/7.1 |
| 4,097,012 | 6/1978 | McIntyre | 224/42.42 R |
| 4,611,734 | 9/1986 | Luecking et al. | 224/42.42 R |
| 4,738,420 | 4/1988 | Angle et al. | 312/7.1 |

*Primary Examiner*—Victor N. Sakran

[57] ABSTRACT

A universal mounting system for mounting communication equipment of various sizes within an automobile. The console's universal mounting system allows for the mounting of any of a wide variety of relatively standard communication equipment. The universality of the mounting system allows for field upgrading or repositioning of the communication equipment without replacing or making changes in the mounting hardware.

2 Claims, 3 Drawing Sheets

UNIVERSAL VEHICLE COMMUNICATION CONSOLE

BACKGROUND OF THE INVENTION

1. Field of the Invention

This invention relates in general to communication equipment, and more specifically to a universal mounting system for communication equipment of various sizes within an automobile.

2. Prior Art

In the past, it has been generally necessary, when a console is required to house communication equipment, that the particular piece of equipment be identified prior to fabrication of the bezel and mounting brackets. This requirement was driven by the prior art in which a dedicated plate or bezel is configured to mate with the equipment specified. This is evident in Johnson U.S. Pat. No. 3,827,772 (Aug. 6, 1974) in which the invention cites "such openings may have any configuration as necessary to accommodate a particular control panel". In a later improvement invention by Johnson, U.S. Pat. No. 3,984,161 (Oct. 5, 1976) the equipment again is mounted to a specifically shaped bezel.

Previously, if the end user desired to make a change in the type of equipment being used or otherwise wished to relocate the equipment within the console for ergonomic related factors, a significant change in the console was required. The bezel had to be replaced or holes in the housing relocated to accommodate variations in equipment size or bezel shape. Furthermore, holes tapped/threaded in thin sheet metal have proven to be easily stripped or cross threaded, a condition which renders the entire housing unusable. This is a significant problem because the housing then has to be removed from the automobile for repair or replacement.

An additional noteable concern with the prior art is that forward seat travel is limited by the console and if the seat is pulled to far forward, access to the equipment can be inhibited. Further, if the console were to be adjusted into a position so that additional forward seat travel was allowed, access to automobile heater controls then becomes limited.

The prior art uses a number of screws/fasteners to secure the top plate/bezel to the housing. These screw heads present potential catch points for clothing, etc.

Because of the inherent problems related to mounting communication equipment of various sizes to a bezel or creating dedicated bracketry and considering all of the permutations and combinations, it has become clear that the prior art approach to mounting equipment of this type creates too many variables and can lead to the aforementioned problems/issues. To deal with these issues, this present invention offers a universal mounting system that serves to alleviate all of the problems associated with the prior art.

SUMMARY OF THE INVENTION

The present invention is not a mere improvement of prior art, but provides a new concept for mounting communication equipment within a console. The present invention has an inherent capability of mounting the vast majority of available/currently used equipment. Because the mounting system is universal, the console can be provided to the end user without knowing the exact specifications of the equipment to be installed within the console.

The preferred embodiment of the invention utilizes two side rails, each rail containing a "T" shaped slot. A threaded nut plate attached to a hat section shaped bracket with two screws is slid into the end of the rail "T" slot and can be positioned anywhere along the length of the rail. An identical hat section bracket and nut plate assembly is slid similarly into the opposing rail and repeated on both rails so that there are even multiples of this standard hat section bracket positioned along the rails. Note that if the nut plate were to be stripped or cross threaded, it is fairly inexpensive and can be discarded. A housing provides four flanges through which screws are inserted to affix the side rails to the housing. The housing has a front panel with a concave shape allowing forward travel of the automobile seat while maintaining uninhibited access to the equipment. Once the equipment is positioned within the rails, a finish strip can be snapped in place over the hat section bracket on either side to cover any potential catch points for clothing. The console can be mounted to the floor or dashboard of the automobile in a variety of ways which are not specific to the functionality of this invention.

BRIEF DESCRIPTION OF THE DRAWINGS

The advantages, features, and objects of this invention will be more clearly understood from the following detailed description when taken in conjunction with the drawings in which.

DETAILED DESCRIPTION OF AN EMBODIMENT

Figure 1:
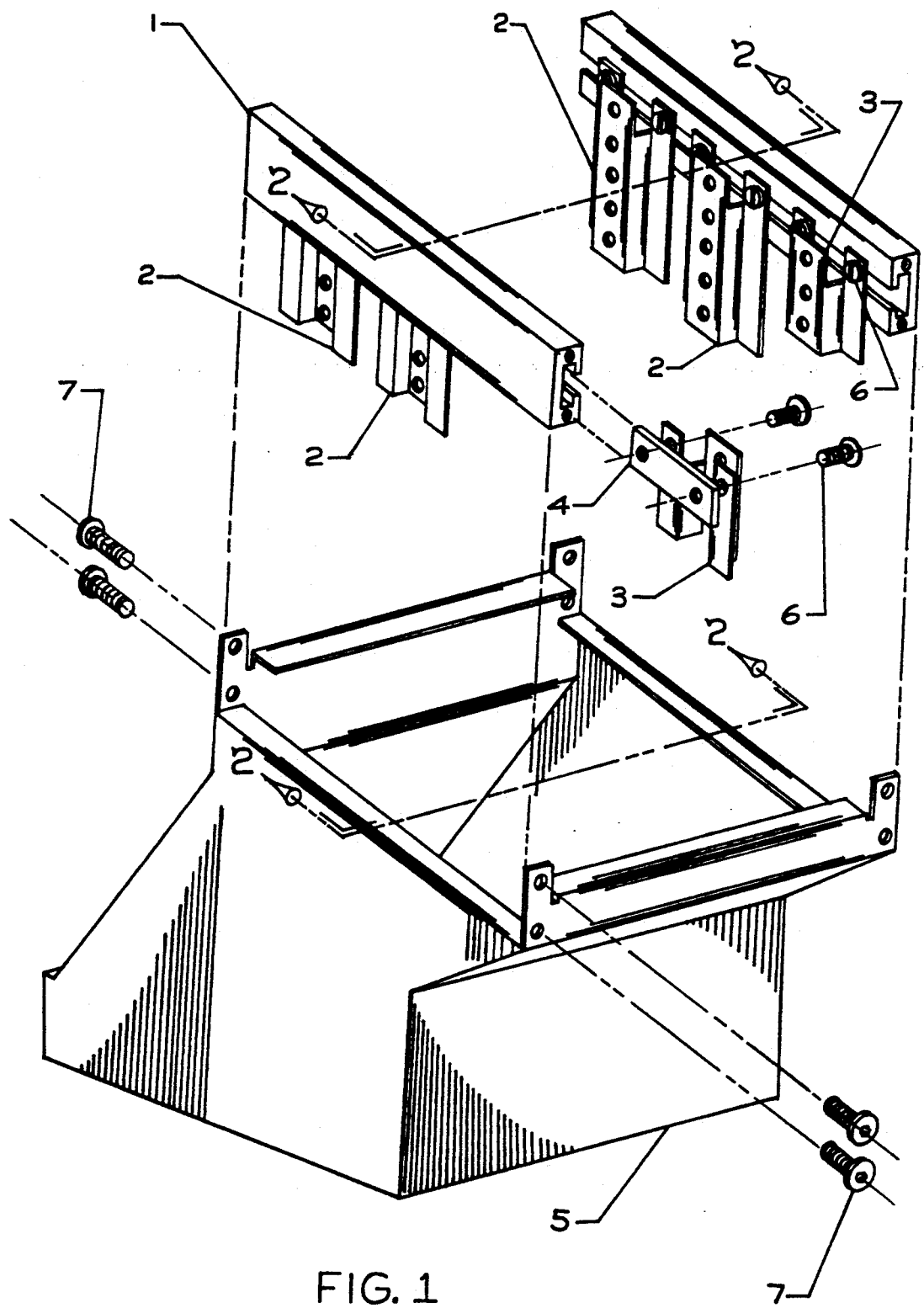
FIG. 1 is an exploded perspective view of a Universal Communication Console constructed in accordance with this invention, without the communication equipment.
Figure 2:
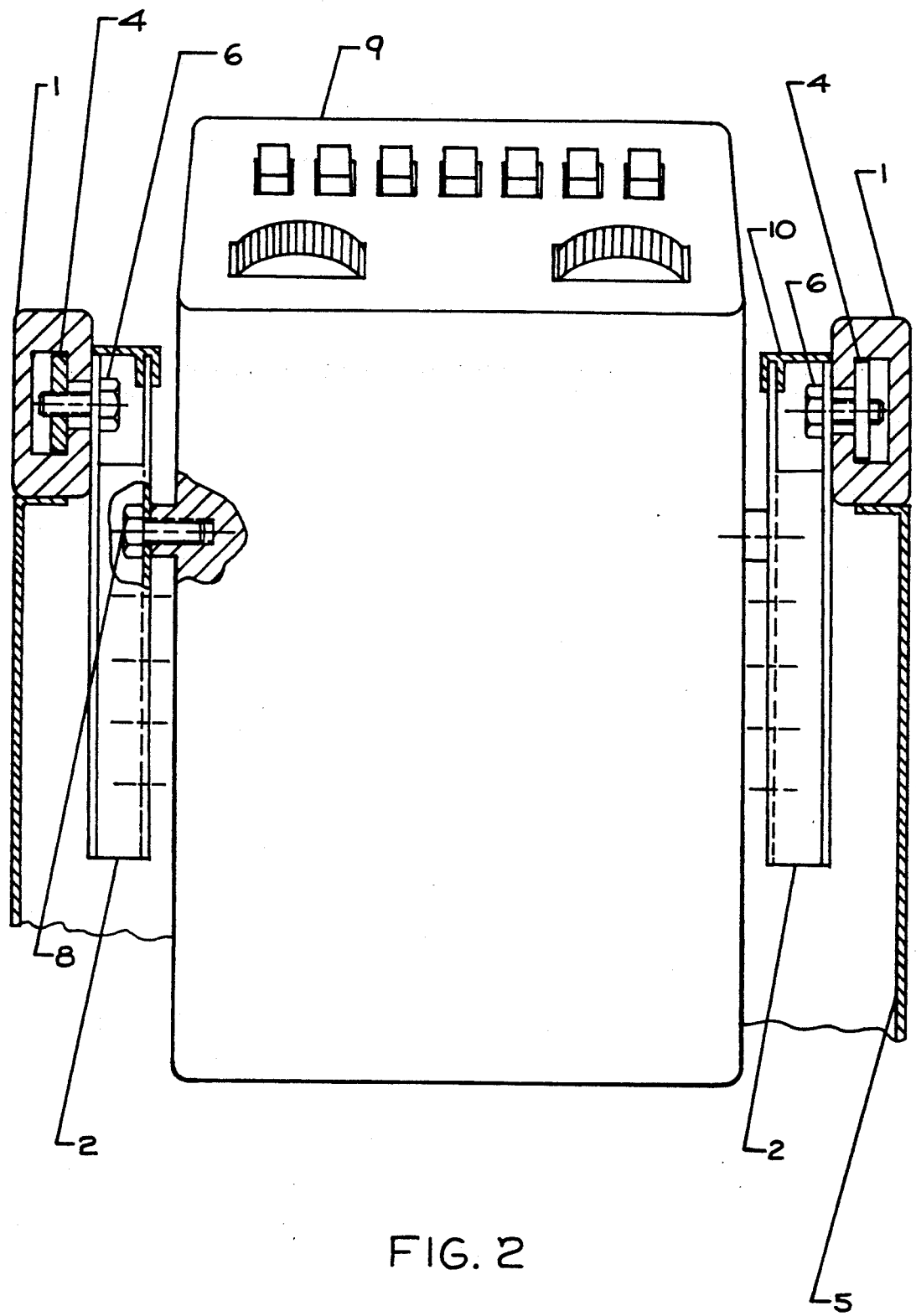
FIG. 2 is a cross sectional view of the universal mounting system, showing a relatively standard piece of communication equipment mounted within the rails.
Figure 3:
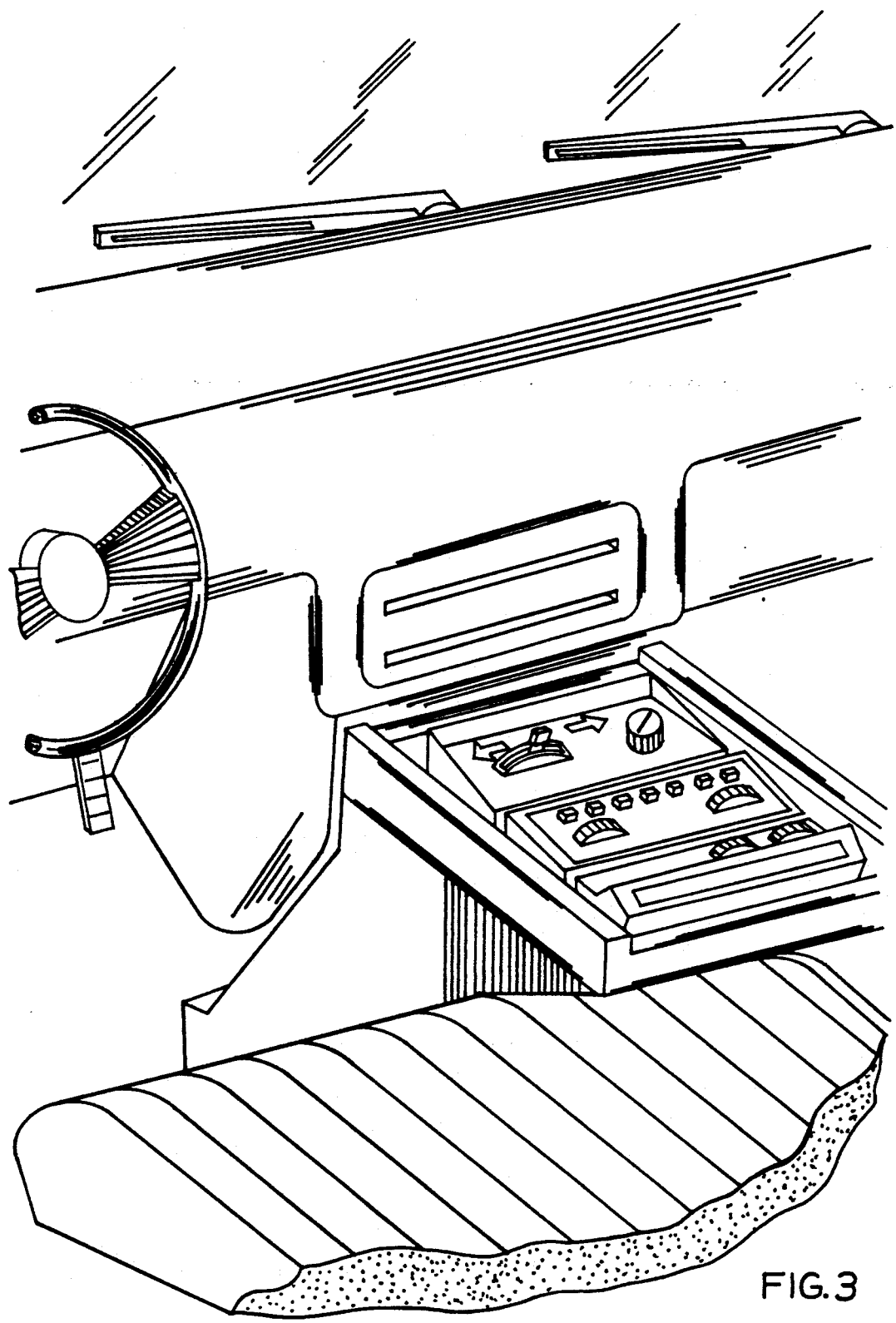
FIG. 3 is a perspective view of an automobile interior showing the preferred mounting position of the communication console, with the automobile seat pulled forward.

With reference now to the drawings, FIGS. 1 and 3 show a Communication Housing 5 which has a concave front panel to allow for automobile forward seat travel. The Housing 5 is formed at the top with four flanges with two holes each, through which Screws 7 are inserted into the Rails 1. Additionally, four flanges are formed inwardly. The flanges on either side create a ledge upon which the Side Rails 1 sit. The flanges front and rear create safety edges with smooth rounded corners. As shown in FIGS. 1 and 2, Rails 1 have "T" shaped slots which can have different configurations depending on the method by which the rails are manufactured. Hat section shaped Brackets 2 are formed to create two planer flanges with one hole in each flange through which Screws 6 are inserted and threaded into Nut Plate 4. Said nut plate is shaped to fit into the "T" slot in the side rail, and tapped holes receive screws used in mounting hat section brackets. A third surface of Bracket 2 and 3 has a series of holes allowing for vertical positioning of communication equipment. As can be seen in FIG. 2, Screws 8 are inserted through one of the series of holes positioned vertically along the Bracket 2 and 3 and into the Communication Equipment 9. Bracket 3 is identical in design and function to Bracket 2, but is shorter to avoid interference with the concave portion of Console 5. Once the equipment is mounted as described above, a Finish Strip 10 is snapped into place over hat section Brackets 2 and 3 as shown in FIG. 2.

What is claimed is:

1. A mounting system for mounting communication equipment of various sizes within an automobile console comprising:

a first and second rail in confronting, spaced, face to face, substantially parallel relationship, each of the said rails comprising at least one continuous slot, said slot providing means whereby at least one nut plate may be captured in each said rail, and said slot further deterring rotation of the said nut plate, said slot being open on the opposing faces of the first and second said rails allowing for installation of fasteners into the captured said nut plate, said slot being open on either end to allow for said nut plate to be inserted or removed from the said first or second rails, a rectangular nut plate with at least one tapped hole into which said fasteners are inserted to join a hat section shaped communication mounting bracket with the said nut plate, said hat section shaped brackets secured to said nut plates and configured to mount said communication equipment of various sizes whereby the said nut plate is inserted into said slot in the end of said rail, said communication equipment being infinitely positionable along the length of said rails, said hat section brackets formed to create two planer flanges with at least one hole in each said flange through which said fasteners are inserted into said nut plate, a third surface of said hat section shaped brackets having a series of holes allowing for vertical positioning of said communication equipment, a housing comprising a base upon which said first and second rails are supported and fastened, said housing enclosing said communication equipment.

2. The mounting system for mounting communication equipment of various sizes recited in claim 1 wherein: said housing has a concave front panel, said concave front panel providing clearance for the automobile seat, said front panel being formed to allow said communication equipment to mount above said automobile seat, said communication equipment being visible to the operator with said automobile seat in any position.

* * * * *